United States Patent [19]

Caniglia

[11] 4,434,520
[45] Mar. 6, 1984

[54] EYEGLASS WIPING DEVICE

[76] Inventor: Joseph E. Caniglia, 5368 E. 134th St., Cleveland, Ohio 44125

[21] Appl. No.: 301,310

[22] Filed: Sep. 11, 1981

[51] Int. Cl.³ .................................................. G02C 13/00
[52] U.S. Cl. ....................................... 15/214; 15/104.94
[58] Field of Search ................ 15/104.94, 210 A, 214, 15/210 B, 218, 218.1; 401/10

[56] References Cited

U.S. PATENT DOCUMENTS

| | | | |
|---|---|---|---|
| 1,003,761 | 9/1911 | Lehmann | 15/214 |
| 1,602,333 | 10/1926 | Burke | 15/214 |
| 2,458,015 | 1/1949 | McDonald | 15/214 |
| 2,490,636 | 12/1949 | Klein | 15/214 |
| 2,658,221 | 11/1953 | Nicoli | 15/210 A X |
| 2,819,484 | 1/1958 | Fouse | 15/210 A X |
| 4,126,962 | 11/1978 | Polcaro | 15/210 R |

Primary Examiner—Edward L. Roberts

Attorney, Agent, or Firm—Maky, Renner, Otto & Boisselle

[57] ABSTRACT

An apparatus for wiping lenses or the like to clean them includes a wiping means for wiping a lens and a support means for supporting the wiping means in operative relation. Adhesive means may be used to attach the wiping means to the support means. Respective support means may be connected by a force fit frictional engagement of a protruding member in a receptacle associated with respective support means. A pair of support means may have respective heads for holding respective wiping means in operative relation; one of the heads may be concave and the other convex with respect to a plane therebetween. Moreover, means to facilitate manual grasping of the apparatus for convenient use also may be provided as part of the support means. A cleaning material or the like may be provided in the wiping material.

17 Claims, 6 Drawing Figures

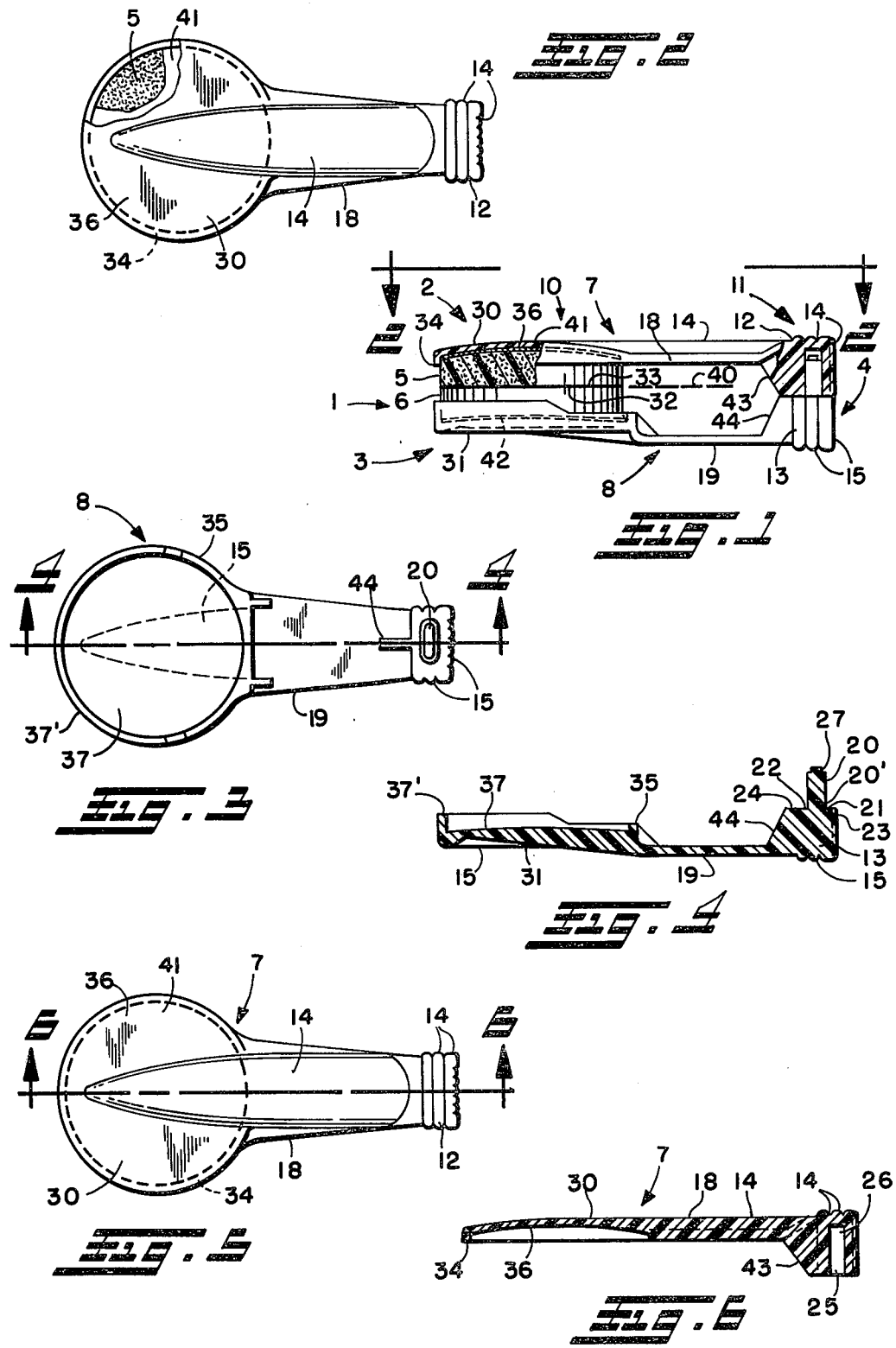

EYEGLASS WIPING DEVICE

TECHNICAL FIELD

The present invention relates generally to wiping devices, more particular to devices for wiping lenses, and in the preferred form to an apparatus for wiping eyeglass lenses to clean them.

BACKGROUND OF PRIOR ART

Users of eyeglasses often are disturbed by dirt, water, e.g. from rain, or the like that accumulates on the lenses and by the need occasionally, and sometimes all too frequently, to clean the lenses. Typically users of eyeglasses clean the lenses by wiping with a paper towel, tissue, handkerchief, other cloth, and sometimes with a special wiping cloth intended for eyeglass lenses. Such prior wiping means usually are not as clean as they should be because of the manner in which they are stored or otherwise are used, and, therefore, when used do not fully clean eyeglass lenses. Also, a satisfactory and clean wiping device is not always conveniently available when needed to wipe lenses.

Several U-shape wiping devices have been developed in the past for wiping eyeglass lenses. Such devices typically include a pair of interconnected resilient supports on which wiping material is mounted. The supports may be separated or allowed to separate to permit a lens to pass between the wiping material, and the device may be resiliently deformed to urge the wiping material into engagement into the lenses to wipe them. There are a number of disadvantages encountered with such prior devices which the present invention is intended to overcome. For example, in some prior devices abrasion of the lenses may occur, and in others the wiping material may too easily become dirty. Moreover, some of such prior devices are relatively expensive.

BRIEF SUMMARY OF INVENTION

As it is described herein, the preferred embodiment of the present invention relates to an apparatus for wiping eyeglass lenses. It will be appreciated, however, that the invention may be used for wiping other types of lenses and the like.

Fundamentally and in accordance with the invention there is provided an apparatus for wiping lenses or the like to clean them, and such an apparatus includes wiping means for wiping a lens and support means for supporting the wiping means in operative relation to effect such cleaning. According to one aspect of the invention adhesive means attaches the wiping means to support means, and according to another aspect a tapered connector arrangement provides a force fit frictional interconnection for holding a pair of support means to place the wiping means in operative relation. According to an additional aspect the support means includes a pair of relatively large head portions to which respective wiping means are operatively coupled, and the head portions are respectively concave and convex relative to a plane therebetween or at least one of the head portions is so curbed. According to a further aspect an enlarged body portion and ribs at one end of the support means facilitate secure manual grasping of the apparatus for use.

With the foregoing in mind a primary object of the present invention is to improve wiping devices and, more particularly, to improve eyeglass wiping devices.

An another object is to facilitate cleaning lenses and, more particularly, eyeglass lenses.

An additional object is to keep clean the wiping surfaces of wiping material used in a device for wiping lenses.

A further object is to avoid abrasion of lenses by a wiping device therefor.

Still another object is to improve the wiping characteristics of a device for wiping lenses, especially to clean such lenses.

Still an additional object is to facilitate connecting supports of wiping material in an apparatus for wiping lenses.

Still a further object is to facilitate the manual grasping and use of a device for wiping lenses.

Even another object is to reduce and preferrably to minimize the cost for an eyeglass wiping device.

Even an additional objection is to provide an eyeglass wiping device that can be carried in a purse, pocket or the like ready for use at virtually any time, to provide such a device that remains relatively clean ready for use at virtually any time, to avoid dirtying or otherwise disturbing the medium in which the device is carried, as well as to enable relatively facile cleaning of the wiping material of such apparatus.

These and other objects and advantages of the present invention will become more apparent as the following description proceeds.

To the accomplishment of the foregoing and relates ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a side elevation and view, partly broken away in section, of an eyeglass wiping device in accordance with the present invention;

FIG. 2 is a top plan view, partly broken away, of the eyeglass wiping device looking generally in the direction of arrow 2—2 of FIG. 1;

FIG. 3 is a top plan view of the lower part of the eyeglass wiping device of FIG. 1 with the wiping material and tape removed therefrom;

FIG. 4 is a section view of the lower part of the device looking generally in the direction of the arrow 4—4 of FIG. 3;

FIG. 5 is a top plan view of the upper part of the device; and

FIG. 6 is a section view of the upper part of the device with the wiping material and tape removed looking generally in the direction of the arrow 6—6 of FIG. 5.

DESCRIPTION OF THE PREFERRED EMBODIMENT

Referring now in detail to the drawing, wherein like reference numerals designate like parts in the several figures, and initially to FIG. 1, an eyeglass wiping device or apparatus in accordance with the present invention is generally indicated at 1. The device 1 includes upper and lower parts 2, 3 (directional references are only for facilitating description and have no other connotation) which are interconnected mechanically by a connector means 4. Each of the upper and lower parts 2, 3 includes wiping material 5, 6 and support means 7,8 that support the wiping material and that are coupled by the connector means 4 to hold the wiping material in relationship operative to wipe a lens placed therebetween.

The device 1 includes a wiping portion 10 which is used to wipe a lens and enlarged body portion 11 which is constructed in a manner to facilitate manual grasping of the device 1 and manipulation thereof to wipe a lens. The wiping portion 10 also may be designed to facilitate manual grasping of the overall device 1. The enlarged body portion 11, accordingly, includes a pair of enlarged bodies 12, 13 at ends of the support means 7, 8 remote from the wiping portion 10. The enlarged bodies 12,13 may be of a size that conveniently fit into the hand of the user, such as in the palm of the hand while the thumb and forefinger of the hand extend toward and possibly over at least part of the wiping portion 10. Furthermore, the enlarged body portion 11 includes smoothly curved rib surfaces 14,15 which with the spacing and arrangement of the support arms 18,19 relative to each other and to the enlarged body portion 11 facilitate secure manual grasping of the device 1. Preferably the edges or corners of the device that are exposed to a hand of a user are smoothly curved to avoid concentrated pressure or force that might cause discomfort to a user or tearing of the user's clothing.

The connector means 4 is located at the enlarged body portion 11. The connector means includes a protruding member 20 seen in FIGS. 1-4 which extends upwardly from its base area 20' adjacent and coupled to the enlarged body 13 of the lower part of 3 of the device. 1. The corners 21,22 where the member 20 leaves or protrudes from the body 13 are sharp as are the corners 23,24, this being so that an intimate engagement of the enlarged body 13 can be effected with a corresponding surface of the enlarged body 12 to form a substantially integral connection thereof avoiding gaps therebetween in the manner illustrated, for example, in FIG. 1. The connector means 4 also includes a receptacle or socket 25 in the enlarged body 12 of the upper part 2 of device 1, as is illustrated most clearly in FIGS. 1, 5 and 6. The receptacle 25 is of a size and configuration adapted to receive the member 20 in close fitting intimate relation in the manner illustrated in FIG. 1, and it is closed on all four sides and at one end to prevent access to the member 20 that would otherwise too easily permit separating of the bodies 12,13. Moreover, to assure strength and security of the connection between member 20 and receptacle 25 preferably at least one, and more preferrably the member 20, is tapered so that a reasonable amount of force is required fully to insert the member into the receptacle and so that the frictional retention of the member in the receptacle will be adequate ordinarily to avoid unwanted separation of the upper and lower parts 2, 3 after they have been asembled in the manner shown in FIG. 1. As an example, as is seen in FIG. 4, the member 20 is tapered approximately one degree from the normal to the surfaces of the enlarged body portion 13 from which the member protrudes. Such taper is on both sides of the member 20, although it may be only on a single side, if desired. Also, if desired, the receptacle itself may be tapered from a relatively wide opening into which the member 20 is inserted down to a relatively narrower bottom 26, while the sides of the member 20 are parallel to each other, this arrangement also providing the good force fit interengagement of such connector means 4. A step 27 at the distal end of the member 20 provides guidance and "forgiveness" to facilitate insertion of member 20 and also to facilitate intentional withdrawl to separate the parts 2,3, say for cleaning.

The bodies 12,13 and connector means 4, as well as the support arms 18,19, are of a design and construction that facilitate injection molding thereof using relatively minimum amount of material, on the one hand, to manufacture the device 1, while, on the other hand, providing secure support for the wiping portion 10 of the device 1, strength of connection of the upper and lower parts 2,3 and facility of use of the device. Also, only a minimum number of parts are required to form the connector means 4. Curved, tapered ribs 28,29 along support arms 18,19 strengthen the latter while minimizing quantity of material required for the support means 7,8.

Although the plan view width, as is seen in FIGS. 2, 3 and 5 of the enlarged bodies 12, 13 and support arms 18, 19 of the support means 7,8 are relatively narrow to minimize the material required to make the same, to minimize the cost for the same, to minimize the weight of the same, and to facilitate manual holding of the device 1, the plan view dimension of the holder heads 30,31 of support means 7,8 is of a relatively large size to maximize the quantity of wiping material 5,6 in the device 1 and, more particularly, to provide relatively large wiping surfaces 32, 33 of such material for wiping the respective surfaces of a lens. The holder heads 30, 31 of the support means 7, 8 are circular in plan view to enable use of circular wiping material 5, 6 that relatively easily can wipe all portions of a lens which usually will not have sharp corners. The curved plan of the holder heads 30, 31 also avoids any sharp edges that might cut the material of a pocket or other container for the device 1 and also avoids the possibility of injury to a user by a sharp cornered device. The holder heads 30, 31 also have upstanding circumferential lips 34, 35, respectively about the respective edges of each platform 36, 37 of the holder heads generally confining the wiping material 5,6 within the circular boundaries of such edges or lips. On the other hand, the edges 34, 35 are relatively widely spaced from each other i.e. having a shorter height or vertical dimension than the thickness or vertical dimension of the wiping material 5,6, in order that a substantial quantity of wiping material will not be rigidly confined thereby so as to permit relatively facile deformation of the wiping material by a lens inserted between the surfaces 32, 33 thereof.

The surfaces 32, 33 of the wiping material 5,6 preferrably are mounted in the holders heads 30, 31 in a manner such that those surfaces are in direct abutting confrontation with each other most preferably along a plane identified as 40. The material 5, 6 most preferably has a resilient characteristic and preferably has a free form vertical dimension, i.e. when unsupported by respective holder heads 30, 31, greater than the space provided therefor between the respective platforms 36, 37 in the device 1 so that such wiping material 5, 6 will be under at least a slight compression with the surfaces 32, 33 engaged. Such slight compression reduces the possibility of dirt having access to and accumulating on the surfaces 32, 33 while the resilient nature of the material 5, 6 still is adequate to enable a lens to be inserted along the plane 40 to be wiped on both surfaces of the lens by the respective surfaces 32, 33 of the wiping material. The plan dimension or cross-section of the platforms 36, 37 and of the surfaces 32, 33 is such that ordinarily it would be somewhat smaller than the smallest diameter dimension of the ordinary eyeglass lens so that the lens may be inserted between the surfaces 32,33 in the device 1 and then the device 1 may be manipulated to cause those surfaces to wipe over the lens surfaces, preferrably cleaning the same. Alternatively, in an event that the plan or a cross section dimension of the surfaces 32, 33 exceeds that of a lens intended to be cleaned thereby, such lens still may be cleaned by the device 1, due to the resilient nature of the wiping material 5, 6 that may overlap the lens frame or other means used to hold the lens while it is moved between the surfaces 32, 33 engagement with portions thereof.

Preferably the platform 36 of the holder head 30 is convex with respect to the plane 40 and the platform 37 of the holder head 31 is concave with respect to the plane 40 in order to match the usual shape of most eyeglass lenses which ordinarily have a concave surface and a convex surface. Usually the device 1 would be placed on an eyeglass lens to wipe the same in a manner such that the convex surface of the lens would engage the wiping material surface 32 so as to be generally parallel with the convex platform 36 that provides a generally uniform pressure against the lens during the wiping, then; and the concave surface of the lens would be placed in engagement with the wiping surface 33 so that such lens surface is parallel to the concave platform 37 which generally causes the wiping material surface 33 to apply approximately uniform pressure to such lens surface. The exterior portions of the respective convex and concave platforms 36, 37 also tends to facilitate manual grasping of the device 1. A guide 37' partially about the platform 37 helps position and secure the wiping material 6 on such platform since the convex curve thereof minimizes the effective height of the lip or edge there.

The wiping material 5, 6 is preferably formed of sponge or sponge-like material. Such material may be natural or synthetic. The preferred material is Scottfelt No. 4900 made by the Scott Paper Company which is anopen cell foam material. In one embodiment it has been found that a sponge material comprised of polyester and cotton, such a material being made by Rubbermaid Manufacturing Co., is a satisfactory choice of wiping material. A purely synthetic wiping material, for example a sponge made exclusively of polyester material, that is hard enough to effect a good wiping and is absorbent enough to wipe any moisture from the lens surfaces, also would be satisfactory. However, the hardness or abrasiveness of the wiping material should be minimized to the extent that it, of course, would be undesirable to scratch a lens during wiping thereof. The convex and concave platforms 36, 37, though, help to avoid the possibility of such a scratching. Moreover, to attach the wiping material 5, 6 to the respect platforms 36, 37 adhesive material applied directly or indirectly to the surface of the material 5,6 remote from the wiping surfaces 32,33, as is represented at 41, 42, may be employed. The adhesive material may permit the wiping material to be replaced, with other or cleaner material if desired, although in the preferred embodiment cleaning of the wiping material is possible so that replacement ordinarily would not be necessary.

Usually the vertical dimension or spacing of the respective holder heads 30, 31 would be preset according to the structural dimensions of the device 1 and the various portions thereof so that there is the desired resilient pressure between the surfaces 32, 33 without there being a need for resilient deformation of the support means 7, 8 during a wiping action. This presetting of the spacing between the holder heads and, thus, of the pressure of the surfaces 32, 33 against each other and, more specifically, against the surfaces of the lens, assures that a relatively controlled pressure will be exerted against such lens surfaces. It has been found that too great a pressure being exerted against the lenses not only may damage them, but also results in a less effective cleaning than a lighter, but controlled pressure would effect. However, if desired, the support arms 18, 19 and/or other portions of the respective support means 7, 8 may be made resilient to enable manual control of such wiping pressure. Also, to maintain the rigid strength of the support arms 18,19 and to help hold the present spacing of the platforms 36,37, strengthening ribs 43,44 may be provided at the junction of the bodies 12,13 and the support arms 18,19.

Ordinarily after the upper and lower parts 2, 3 of the eyeglass wiping device 1 have been assembled in the manner illustrated in FIG. 1, such device is ready for use to wipe eyeglass lenses or the like. It is preferred that the connector means 4 not be disassembled, for in that case the strength of subsequent connections would be diminished; however, if desired, for example for cleaning the wiping material 5, 6 or for replacing the same, such a parting at the connector means 4, may be permitted, depending on the strength of the connection there.

In using the eyeglass wiping device 1, a person would in one hand hold a pair of eyeglasses with the temple legs pointing away from the person. The device 1 would be held in a manner such that the upper and lower convex and concave platforms 36, 37 are parallel with the corresponding upper and lower convex and concave surfaces of the eyeglass lenses. One lens of the pair of eyeglasses would be placed between the wiping material 5, 6 generally along the plane 40 and the user may wipe the entire lens preferably with linear motion until the lens becomes satisfactorily clean. This step may be repeated for the other lens of the eyeglasses.

If the wiping material 5, 6 were to become excessively dirty, they may be washed with a constant flow of warm water thereover. The material 5, 6 may be dried by squeezing them together releasing excess water and, thereafter, a paper towel may be placed therebetween to absorb any water residue.

If desired, a small quantity of cleaning solvent or material may be placed in or near the center of each surface 32, 33 of the wiping material 5, 6 or even throughout such wiping material to assist in cleaning eyeglass lenses, for example. An example of such cleaning material may be one or a combination of silicone materials, such as, for example SF-1173 (a silicone cleaning agent) and/or Viscocil (a silicone polishing and defogging agent) both sold by General Electric Company. The ratio of the such materials may be varied depending on the desired relative amount of cleaning and/or polishing to be accomplished.

STATEMENT OF INDUSTRIAL APPLICATION

With the foregoing in mind it will be clear that the eyeglass wiping device 1 may be used to wipe the lenses of eyeglasses or the like ordinarily cleaning them from accumulated dirt, oil, grease and the like.

I claim:

1. An apparatus for cleaning lenses or the like, comprising wiping means for wiping a lens, support means for supporting said wiping means, and adhesive means for attaching said wiping means to said support means wherein said support means further comprising a pair of support platforms for supporting at least two wiping means, a pair of arms and connector means, said arms respectively coupling said support platforms with said connector means, and said connector means comprising means for connecting said support means to support said wiping means in opposed relation to each other to wipe a lens, including a protruding member associated with one of said support means a receptacle associated with the other of said support means, at least one of said member and receptacle being tapered, whereby upon forced insertion of said member into said receptacle the two cooperate to form a secure connection therebetween.

2. The apparatus of claim 1, said support means including a pair of relatively large head portions at which respective wiping means are operatively coupled thereto, one of said head portions being concave and the other of said head portions being convex with respect to a plane therebetween.

3. The apparatus of claim 1, said wiping means comprising two wiping means of circular plan shape, and said support means comprising a pair of circular support platforms for supporting respective wiping means.

4. The apparatus of claim 3, said support platforms further comprising lip edge means generally circumscribing at least a portion thereof to hold said wiping means in position thereon against lateral displacement while allowing a substantial quantity of wiping means to be easily deformed by insertion of a lens between said wiping means, said lip edge means having a smaller height than the thickness dimension of each of said wiping means.

5. Apparatus for wiping lenses or the like comprising a pair of wiping means for wiping a lens or the like, a pair of support means for supporting respective wiping means in relation to each other to wipe a lens placed therebetween, and connector means for connecting said support means to support said wiping means in opposed relation to each other to wipe a lens, said connector means including a protruding member association with one of said support means and a receptacle associated with the other of said support means, at least one of said member and receptacle being tapered, whereby upon forced insertion of said member into said receptacle the two cooperate to form a secure connection therebetween.

6. The apparatus of claim 5, said wiping means comprising sponge-like material.

7. The apparatus of claim 5, said wiping means comprising felt-like material.

8. The apparatus of claim 5, said receptacle comprising a generally rectangular socket and said protruding member comprising a tapered protruding member.

9. The apparatus of claim 8, wherein the cross section at a base portion of said protruding member is larger than the relatively free open cross sectional area of said receptacle where such base portion enters said receptacle.

10. The apparatus of claim 9, said connector means comprising an enlarged body means at an end of each support means remote from said wiping means for facilitating manual grasping of the apparatus, and wherein said protruding member extends from one of said enlarged body means and said socket comprises a recess in the other of said body means.

11. The apparatus of claim 10, wherein each of said body means has relatively smooth corners where the same ordinarily is grasped by a user.

12. The apparatus of claim 5, said support means further including a pair of relatively large head portions at which respective wiping means are operatively coupled thereto, one of said head portions being concave and the other of said head portions being convex with respect to a plane therebetween.

13. The apparatus of claims 5 or 12, said support means including body means proximate an end of said support means remote from said wiping means for facilitating grasping by the hand of a user, said body means including a curved portion leading toward a respective wiping means to guide a part of the hand of a user to secure holding of the apparatus for use to wipe a lens or the like.

14. The apparatus of claim 5, each of said support means comprising an arm, a body portion forming said connector means, and enlarged holder head means at an end of each arm for holding respective wiping material.

15. Apparatus for wiping lenses or the like, comprising a pair of wiping means for wiping such lenses, and support means for supporting said wiping means in opposed position to wipe a lens therebetween, said support means including a pair of relatively large head portions at which respective wiping means are operatively coupled thereto, at least one of said head portions being concave or the other of said head portions convex with respect to a plane therebetween, said support means comprising a pair of support means, each containing a respective one of said head portions, and further comprising connector means for connecting said support means to support said wiping means in opposed relation to each other to wipe a lens, said connector means including a protruding member associated with one of said support means and a receptacle associated with the other of said support means, at least one of said member and receptacle being tapered whereby upon forced insertion of said member into said receptacle the two cooperate to form a secure connection therebetween.

16. The apparatus of claim 15, said head portions comprising circular platforms and wherein said wiping material has a circular plan configuration.

17. The apparatus of claim 16, said support means further comprising lip edge means generally circumscribing said head portions to hold said wiping means in position thereon against lateral displacement while allowing a substantial quantity of wiping means to be easily deformed by insertion of a lens between said head portions.

* * * * *